(12) United States Patent
Holl et al.

(10) Patent No.: US 8,190,947 B1
(45) Date of Patent: May 29, 2012

(54) METHOD AND SYSTEM FOR AUTOMATICALLY CONSTRUCTING A REPLICA CATALOG FOR MAINTAINING PROTECTION RELATIONSHIP INFORMATION BETWEEN PRIMARY AND SECONDARY STORAGE OBJECTS IN A NETWORK STORAGE SYSTEM

(75) Inventors: James Holl, Sunnyvale, CA (US); Anawat Chankhunthod, Sunnyvale, CA (US); Konstantinos Roussos, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 289 days.

(21) Appl. No.: 12/704,327

(22) Filed: Feb. 11, 2010

(51) Int. Cl.
*G06F 11/00* (2006.01)

(52) U.S. Cl. .......................................... 714/15; 709/203

(58) Field of Classification Search ...................... 714/15
See application file for complete search history.

(56) References Cited

U.S. PATENT DOCUMENTS

| | | | | |
|---|---|---|---|---|
| 6,058,416 | A * | 5/2000 | Mukherjee et al. | 709/203 |
| 6,195,685 | B1 * | 2/2001 | Mukherjee et al. | 709/205 |
| 6,301,589 | B1 * | 10/2001 | Hirashima et al. | 1/1 |
| 6,360,331 | B2 * | 3/2002 | Vert et al. | 714/4.4 |
| 7,058,958 | B1 * | 6/2006 | Shutt et al. | 719/328 |
| 7,185,076 | B1 * | 2/2007 | Novaes et al. | 709/223 |
| 7,475,077 | B2 * | 1/2009 | Burnett et al. | 1/1 |
| 7,653,668 | B1 * | 1/2010 | Shelat et al. | 707/610 |
| 2002/0059329 | A1 * | 5/2002 | Hirashima et al. | 707/204 |
| 2007/0124308 | A1 * | 5/2007 | Johnson et al. | 707/10 |
| 2008/0208917 | A1 * | 8/2008 | Smoot et al. | 707/200 |
| 2008/0240584 | A1 * | 10/2008 | Saiga et al. | 382/232 |
| 2009/0006486 | A1 * | 1/2009 | Burnett et al. | 707/200 |
| 2011/0225362 | A1 * | 9/2011 | Leggette | 711/114 |

* cited by examiner

*Primary Examiner* — Scott Baderman
*Assistant Examiner* — Kamini Patel
(74) *Attorney, Agent, or Firm* — Blakely, Sokoloff, Taylor & Zafman LLP (57) ABSTRACT

Embodiments of the present invention provide a technique for automatically constructing a replica catalog providing information otherwise unavailable due to a loss of or failure with the registry file for maintaining protection relationship information of primary and secondary storage objects by extracting storage object settings from an encoded attribute of the secondary storage object. An administrator provides protection relationship information for the primary and secondary storage objects at a remote computer system (e.g., protection manager), which may be automatically encoded in an attribute of the secondary storage object and stored in a replica catalog at the protection manager. A secondary storage server constructs the secondary storage object using the encoded attribute and stores data replicated from the primary storage object. If the replica catalog is lost, the replica catalog may be automatically reconstructed by retrieving the encoded attribute and extracting the protection relationship information from the encoded attribute.

24 Claims, 8 Drawing Sheets

METHOD AND SYSTEM FOR AUTOMATICALLY CONSTRUCTING A REPLICA CATALOG FOR MAINTAINING PROTECTION RELATIONSHIP INFORMATION BETWEEN PRIMARY AND SECONDARY STORAGE OBJECTS IN A NETWORK STORAGE SYSTEM

FIELD OF THE INVENTION

The present invention relates to network storage systems, and more particularly, to automatically constructing a replica catalog for maintaining protection relationship information of primary and secondary storage objects by extracting storage object settings from an encoded attribute of the secondary storage object.

BACKGROUND

A storage server is a computer that provides access to information that is stored on one or more storage devices connected to the storage server, such as disk drives ("disks"), flash memories, or storage arrays. The storage sever includes an operating system that may implement a storage abstraction layer to logically organize the information as storage objects on the storage devices. With certain logical organizations, the storage abstraction layer may involve a file system which organizaes information as a hierarchical structure of directories and files. Each file may be implemented as set of data structures, e.g., disk blocks, configured to store information, such as the actual data for the file. The file system typically organizes such data blocks as a logical "volume", where each volume may be associated with its own file system and may further be organized into logical sub-volumes referred to as qtrees. Each directory, file, qtree, and volume may constitute a storage object. In other logical organizations, a file system may constitute a storage object with the storage abstraction layer managing multiple file systems.

The storage server may be configured to operate according to a client/server model of information delivery to allow one or more clients access to data stored on the storage server. In this model, the client may comprise an application executing on a computer that "connects" to the storage server over a computer network, such as a point-to-point link, shared local area network, wide area network or virtual private network implemented over a public network, such as the Internet. A client may access the storage devices by submitting access requests to the storage server, for example, a "write" request to store client data included in a request to storage devices or a "read" request to retrieve client data stored in the storage devices.

Multiple storage servers may be networked or otherwise connected together as a network storage system to protect against a failure of one or more of the storage servers which would otherwise leave data of the failed storage server inaccessible. To accomplish this, data of a protected storage server (primary storage server) may be replicated to another storage server (secondary storage server) to ensure continued access to client data in the event the primary storage server fails. Data replication may involve backups, such as a read-only, point-in-time images of data referred to as "snapshots", or mirrors (e.g., actual copies) of data. Upon a failure, the secondary storage server may operate to provide continued access to client data using the replicated data. The primary and secondary storage servers are in this way configured to implement a "protection relationship."

The primary storage server typically services storage requests on one or more storage objects such as volumes, qtrees, or snapshots, in which each may be protected by the same or different secondary storage server as another storage object. To manage the relationships between storage objects in the network storage system, protection relationship information may be stored in a registry file of a file system at the primary storage server. Protection relationship information may include storage object settings such as a storage object type (e.g., volume, qtree, snapshot), a type of replication performed between storage objects (e.g., backup, mirror), and the frequency of replication (e.g., minutes, hours, days), for example. When a primary storage object fails, information in the registry file may be used to reconstruct the primary storage object from, and reinstate the protection relationship with, a secondary storage object. Since a secondary storage object already references a primary storage object having certain storage object settings, reconstructing the primary storage object in accordance with such settings efficiently reinstates the protection relationship between the reconstructed storage object and the secondary storage object without substantial reconfiguration of the secondary storage object.

One deficiency with the present approach, however, is the reliance on the availability and accessibility of the registry file at the primary storage server. In certain albeit unusual cases, a loss of or failure with the registry file may occur during the transfer of replicated data, a failure of the storage server, or an accidental deletion of the registry file by an administrator, resulting in the loss of protection relationship information stored therein. To recover from such a loss, a copy of the registry file may be stored in a second location of the primary storage server such as the root file system, which may be accessed during a manual or scripted restore of the file system. However, availability of such a copy remains deficient in instances where the primary storage server fails entirely.

One conventional technique for ensuring continued access to information provided by the registry file involves the administrator maintaining a physical record of storage object settings. However, in addition to the burdens of maintaining a physical record, the administrator must also possess detailed knowledge and/or specialized skills to reconstruct a failed storage object using information documented in the physical record. In certain cases, the administrator may encode storage object settings in attributes of the storage objects to avoid the need for a separate physical record. However, such encoding is typically performed at the discretion of the administrator which would still require specialized knowledge by the administrator to decipher the encoded information for extracting the relevant information.

SUMMARY

Embodiments of the present invention provide a technique, in a network storage system, for automatically constructing a replica catalog providing information otherwise unavailable due to a loss of or failure with the registry file for maintaining protection relationship information of primary and secondary storage objects by extracting storage object settings from an encoded attribute of the secondary storage object. An administrator provides protection relationship information for the primary and secondary storage objects at a remote computer system (e.g., protection manager). The protection relationship information may be automatically encoded in an attribute of the secondary storage object and stored in a replica catalog at the protection manager. A secondary storage server constructs the secondary storage object using the encoded attribute and services the secondary storage object. In the event the replica catalog is lost, a new replica catalog may be automatically constructed by e.g., the network storage system retrieving the encoded attribute from the secondary storage object and extracting the protection relationship information from the encoded attribute.

Using aspects of the novel techniques described herein, the present invention overcomes the deficiencies of the conventional approaches since the protection manager automatically encodes protection relationship information in storage object attributes to avoid the need for specialized encoding and decoding knowledge by the administrator. A new replica catalog may further be automatically constructed to provide continued access to protection relationship information of the storage objects in the event of a disaster. Additionally, the replica catalog may be reconstructed in a remote location such as a protection manager or other location remote from the primary storage server which may survive a failure at the primary storage server.

Yet further inefficiencies with the conventional techniques are overcome using the novel techniques when processing updates to storage object settings. Updates to storage object settings typically require the administrator to manually update the secondary storage object attribute to ensure that current protection relationship information is encoded in the attribute. Advantageously, the novel technique automatically processes such updates by generating a new encoded attribute for the secondary storage object responsive to an update request by the administrator. The new encoded attribute may then be provided to the secondary storage server for processing therein. The new replica catalog may further be constructed to include the current storage object setting whereas conventional techniques may provide storage object settings current only as of the last manual update performed by the administrator.

Additional aspects of the invention will become apparent from the following detailed description taken in conjunction with the accompanying drawings, which illustrate the principles of the invention by way of example.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

A method and system for automatically constructing a replica catalog storing protection relationship information between primary and secondary storage objects in a network storage system by using storage object settings extracted from an encoded attribute of the secondary storage object is provided herein. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

System Overview

Figure 1A:
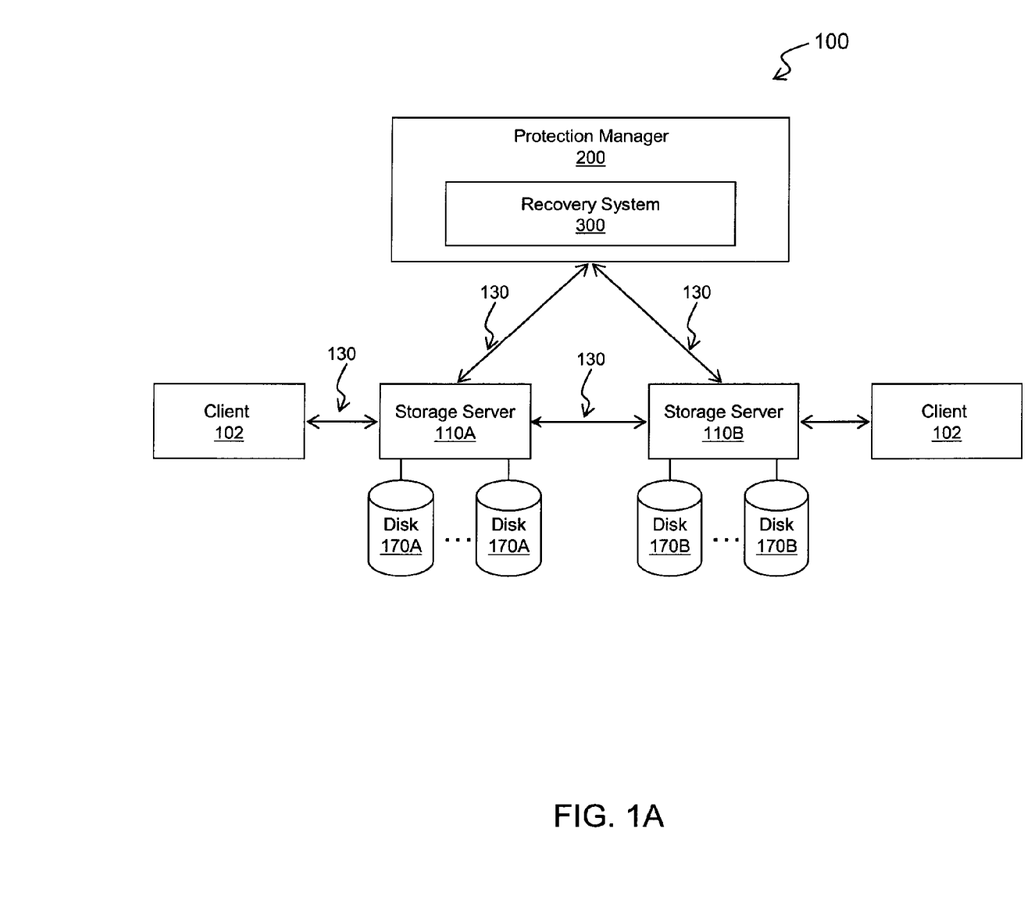
FIG. 1A illustrates a network storage system in which the present invention may be implemented.

FIG. 1A shows a network storage system 100 in which the present invention can advantageously be implemented in one embodiment. Storage servers 110 (storage servers 110A, 110B) each manage multiple storage units 170 that include mass storage devices (not shown). These storage servers provide data storage services to one or more clients 102 through a network 130. Network 130 may be, for example, a local area network (LAN), wide area network (WAN), metropolitan area network (MAN), global area network such as the Internet, a Fibre Channel fabric, or any combination of such interconnects. Each of clients 102 may be, for example, a conventional personal computer (PC), server-class computer, workstation, handheld computing or communication device, or other special or general purpose computer.

Storage of data in storage units 170 is managed by storage servers 110 which receive and respond to various read and write requests from clients 102, directed to data stored in or to be stored in storage units 170. Storage units 170 constitute mass storage devices which can include, for example, flash memory, magnetic or optical disks, or tape drives. The storage devices in storage units 170 can further be organized into arrays (not shown in this figure) implementing a Redundant Array of Inexpensive Disks/Devices (RAID) scheme, whereby storage servers 110 access storage units 170 using one or more RAID protocols known in the art.

Storage servers 110 can provide file-level service such as used in a network-attached storage (NAS) environment, block-level service such as used in a storage area network (SAN) environment, a service which is capable of providing both file-level and block-level service, or any other service capable of providing other data access services. Although storage servers 110 are each illustrated as single units in FIG. 1A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 1B.

In yet other embodiments, storage servers 110 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup, or secondary storage server connected to a primary storage server. A network storage subsystem can also be implemented with a collection of networked resources provided across multiple storage servers and/or storage units.

Illustratively, one of the storage servers (e.g., storage server 110A) functions as a primary provider of data storage services to client 102. Data storage requests from client 102 are serviced using disks 170A organized as one or more storage objects. A secondary storage server (e.g., storage server 110B) takes a standby role in a protection relationship with the primary storage server, replicating storage objects from the primary storage server to storage objects organized on disks of the secondary storage server (e.g., disks 170B). In operation, the secondary storage server does not service requests from client 102 until data in the primary storage object becomes inaccessible such as in a disaster with the primary storage server, such event considered a failure at the primary storage server. Upon a failure at the primary storage server, requests from client 102 intended for the primary storage object are serviced using replicated data (i.e. the secondary storage object) at the secondary storage server.

It will be appreciate that in other embodiments, network storage system 100 may include more than two storage servers. In these cases, protection relationships may be operative between various storage servers in system 100 such that one or more primary storage objects from storage server 110A may be replicated to a storage server other than storage server 110B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 110 should be taken as illustrative only.

In one embodiment, a protection manager 200 connects to storage servers 110 through network 130 for providing management services to storage servers 110. Protection manager 200 may be, for example, a conventional personal computer (PC), server-class computer, workstation, handheld computing or communication device, or other special or general purpose computer. Illustratively, a user (e.g., administrator) may interface with protection manager 200 to request the performance of certain operations and/or supply inputs to protection manage 200 for carrying out services in support of managing storage servers 110.

Preferably, a novel recovery system 300 is operative in protection manager 200 for managing the protection relationship information of storage objects on disks 170 in a data structure such as a replica catalog and constructing a new replica catalog at the protection manager storing the replica catalog. Protection relationship information may include the settings or configuration of the primary storage object such as the name of the primary storage object, the primary storage object type (e.g., volume, qtree, snapshot), and the frequency of replication. Preferably, protection manager 200 operates remotely from storage servers 110 for providing continued access to protection relationship information notwithstanding a failure with one of storage servers 110, however, protection manager 200 may in other embodiments operate within the secondary storage server consistent with teachings of the present invention.

In operation, the administrator may interface with protection manager 200 to supply protection relationship information between storage objects in system 100. Recovery system 300 may store this information in a data structure such as the replica catalog and generate encoded attributes of the secondary storage objects using such information. The generated attributes are further provided to storage servers 110 for constructing the secondary storage objects. Upon a failure with the replica catalog, recovery system 300 may construct a new replica catalog (i.e. reconstruct the replica catalog) by retrieving the encoded attributes from storage server 110B and extracting the protection relationship information from the retrieved attributes. Advantageously, updates to storage object settings, such as an increase or decrease in replication frequency for instance, may also be processed by recovery system 300 automatically generating and providing to the secondary storage object a new encoded attribute. In this way, encoded attributes may indicate a current storage object setting of the primary storage object without the administrator manually constructing and configuring a new encoded attribute for the secondary storage object.

Figure 1B:
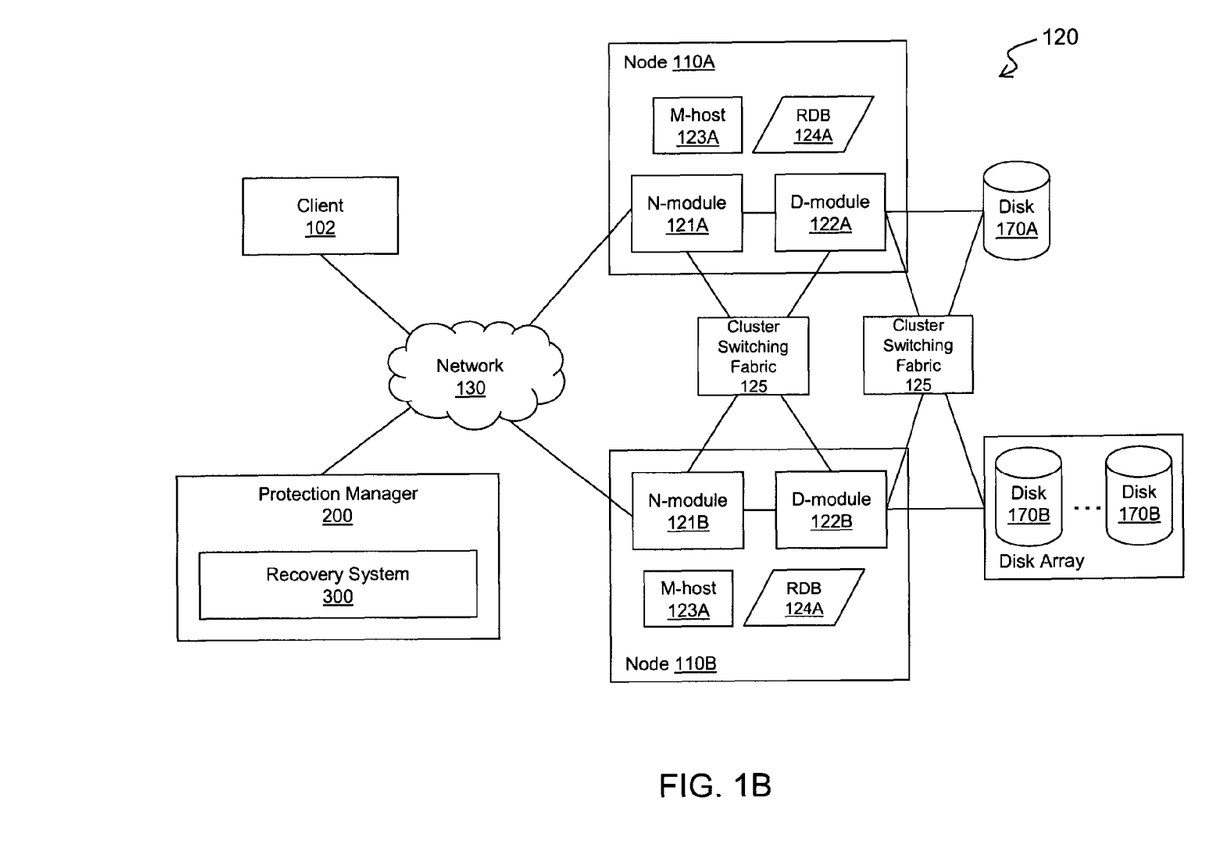
FIG. 1B illustrates a distributed or clustered architecture for a network storage system in which the present invention may be implemented in an alternative embodiment.

FIG. 1B illustrates a schematic block diagram of a distributed or clustered network storage system 120 which may implement the principles of the present invention in one embodiment. System 120 may include storage servers implemented as nodes 110 (nodes 110A, 110B) which are each configured to provide access to storage devices 170. In the illustrative example, nodes 110 are interconnected by a cluster switching fabric 125 which may be embodied as an Ethernet switch for instance.

Nodes 110 may be operative as multiple functional components that cooperate to provide a distributed architecture of system 120. To that end, each node 110 may be organized as a network element or module (N-module 121A, 121B), a disk element or module (D-module 122A, 122B), and a management element or module (M-host 123A, 123B). In one embodiment, each module includes a processor and memory for carrying out respective module operations. For example, N-module 121 may include functionality that enables node 110 to connect to client 102 via network 130 and may include protocol components such as a media access layer, Internet Protocol (IP) layer, Transport Control Protocol (TCP) layer, User Datagram Protocol (UDP) layer, and other protocols known in the art.

In contrast, D-module 122 may connect to one or more storage devices 170 via cluster switching fabric 125 and may be operative to service access requests on devices 170. In one embodiment, the D-module 122 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. Illustratively, a storage abstraction layer (e.g., file system) of the D-module divides the physical storage of devices 170 into storage objects. Requests received by node 110 (e.g., via N-module 121) may thus include storage object identifiers to indicate a storage object on which to carry out the request.

Also operative in node 110 is M-host 123 which provides cluster services for node 110 by performing operations in support of a distributed storage system image, for instance, across system 120. Illustratively, M-host 123 provides cluster services by managing a data structure such as a RDB 124 (RDB 124A, RDB 124B) which contains information used by N-module 121 to determine which D-module 122 "owns" (services) each storage object. The various instances of RDB 124 across respective nodes 110 may be updated regularly by M-host 123 using conventional protocols operative between each of the M-hosts (e.g., across network 130) to bring them into synchronization with each other. A client request received by N-module 121 may then be routed to the appropriate D-module 122 for servicing to provide a distributed storage system image.

Protection manager 200 in system 120 may connect to nodes 110 via network 130 for performing operations of recovery system 300. In a distributed environment, recovery system 300 may provide encoded attributes to N-module 121 configured to receive requests to construct storage objects and to update attributes of storage objects on disks 170. N-module 121 may then forward the requests across cluster switching fabric 125 to D-module 122 for servicing of the requested storage object. Upon a failure with the replica catalog, D-modules 122 may provide recovery system 300 the encoded attributes (via N-module 121) which may be processed by recovery system 300 extracting protection relationship from the encoded attributes and reconstructing the replica catalog. Subsequent reconstruction of failed primary storage objects may then involve accessing the reconstructed replica catalog to determining the storage object settings for implementing a protection relationship between the reconstructed storage object and the secondary storage object.

It should be noted that while FIG. 1B shows an equal number of N- and D-modules constituting a node in the illustrative system, there may be different number of N- and D-modules constituting a node in accordance with various embodiments of the present invention. For example, there may be a number of N-modules and D-modules of node 110A that does not reflect a one-to-one correspondence between the N- and D-modules of node 110B. As such, the description of a node comprising one N-module and one D-module for each node should be taken as illustrative only.

Computer Architecture

Figure 2:
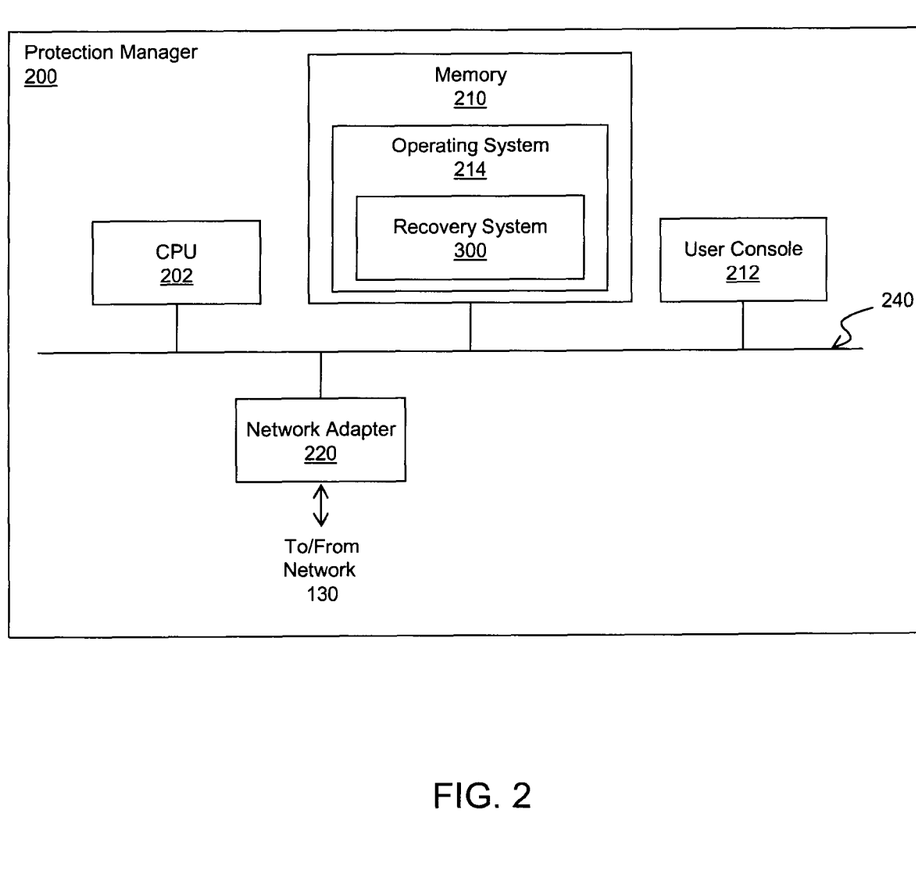
FIG. 2 is a block diagram of an illustrative embodiment of an environment including a protection manager of FIG. 1 in which the invention may be advantageously implemented.

FIG. 2 is a block diagram of an illustrative embodiment of a protection manager (e.g., protection manager 200) implemented as a special- or general-purpose computer. In certain embodiments, the protection manager may be implemented as a user application executed by an operating system of a device in a storage system (e.g., system 100 or system 120) located remotely from a primary storage server (e.g., storage server 110A). For instance, protection manager may be implemented as a user application operative at a secondary storage server (e.g., storage server 110B). It will be appreciated, however, that functional components of the protection manager may be implemented by hardware, firmware, or software-executing processors in accordance with the teachings of the present invention.

Preferably, the protection manager includes a central processing unit (CPU) 202, a memory 210, a network adapter 220, and a user console 212 interconnected by a system bus 240. Memory 210 includes storage locations that are addressable by CPU 202 and network adapter 220 for storing processor-executable instructions and data structures associated with the present invention. Network adapter 220 includes the mechanical, electrical and signaling circuitry needed to connect the protection manager over network 130 from FIG. 1, for instance. CPU 202 and network adapter 220 may thus include processing elements and/or logic circuitry configured to execute software code and manipulate data structures for communicating with other computing devices such as storage servers 110 of FIG. 1. An operating system 214, portions of which are typically resident in memory 210 and executed by CPU 202, functionally organizes the protection manager.

It will be apparent to those skilled in the art that other processing means may be used for executing instructions and other memory means, including various computer readable media, may be used for storing program instructions pertaining to the inventive techniques described herein. It will also be apparent that some or all of the functionality of the processing element (e.g., CPU 202) and executable software can be implemented by hardware, such as integrated currents configured as programmable logic arrays, ASICs, and the like.

Illustratively, user console 212 includes, for example, a keyboard and monitor for enabling an administrator to interface with the protection manager. In one embodiment, the administrator interfaces with user console 212 to request operations and provide input to the protection manager in support of management services provided by the protection manager to storage servers in the system. In other embodiments, the administrator may interface with protection manager across network 130 using graphical user interfaces, for instance.

Also operative in the protection manager is a novel recovery system 300 for managing protection relationship information between storage objects in the system and automatically generating encoded attributes for secondary storage objects based on such information. Recovery system 300 may be implemented as instructions stored in memory 210 and executed by CPU 202 for carrying out such operations in one embodiment. Operations of recovery system 300 further include maintaining a replica catalog for storing the protection relationship information including storage object settings of the primary storage objects, reconstructing the replica catalog upon a failure, and generating new encoded attributes responsive to a request to update the storage object settings.

Illustratively, the administrator interfaces with the protection manager at user console 212 to supply the protection relationship information to recovery system 300. Exemplary information may include the name of the primary and secondary storage servers, as well as storage objects settings of the primary storage object such as the primary storage object type (e.g., volume, qtree, snapshot), the type of replication performed between the storage objects (e.g., backup, mirror), and the frequency of replication (e.g., minutes, hours, days). Recovery system 300 may then automatically generate based on the protection relationship information an attribute (e.g., name or any other unique identifier for the storage object) for the secondary storage object. The generated attribute may then be provided to the secondary storage server (via network adapter 220) within a request to construct the secondary storage object. In the event the replica catalog is lost, the name of the secondary storage objects may be retrieved and processed by recovery system 300 to extract protection relationship information therefrom.

In this way, an administrator need not possess specialized knowledge or skill sets to manage the protection relationship information of storage objects in a storage system. Advantageously, the encoding and construction of the replica catalog may be automatically performed to avoid the manual effort otherwise required of the administrator. Despite a potential loss of the replica catalog, recovery from subsequent failures with the primary storage server may be performed by reconstructing the primary storage object using a reconstructed replica catalog to implement the protection relationship between the reconstruct storage object and the secondary storage object without substantial reconfiguration of a secondary storage object.

Recovery System

Figure 3A:
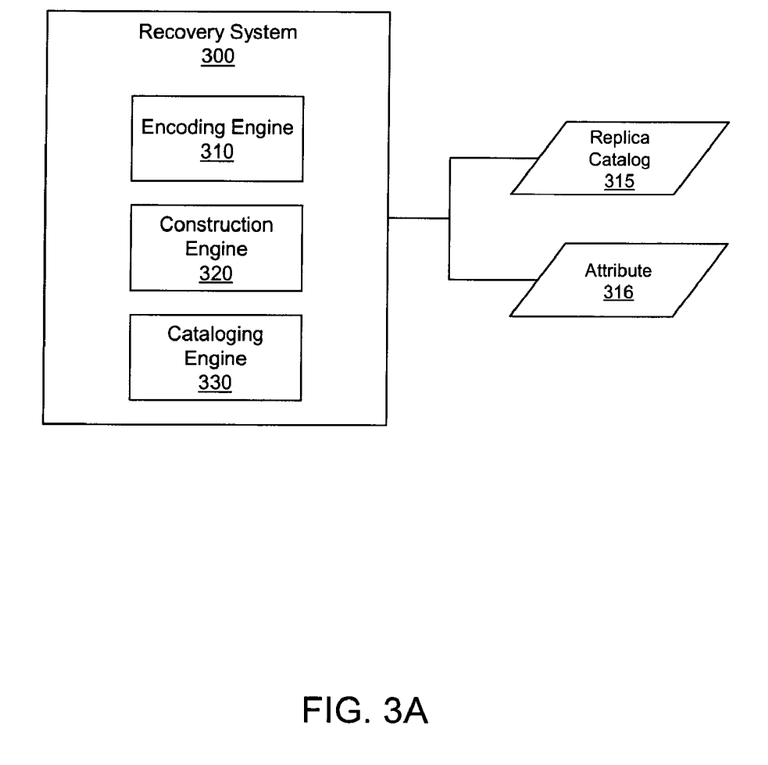
FIG. 3A illustrates a novel recovery system implemented by the protection manager of FIG. 2, according to one embodiment of the present invention.

FIG. 3A illustrates an exemplary recovery system (e.g., recovery system 300) operative in a protection manager (e.g., protection manager 200) for managing the protection relationship information for storage objects in a storage system (e.g., system 100, 120). Illustratively, the recovery system may be implemented by hardware, firmware, software-executing processors or a combination thereof. Preferably, the recovery system may be implemented as instructions stored in memory and executed by a processor of the protection manager. It will be appreciated, however, that functionality of the recovery system may in alternative embodiments be implemented in a secondary storage server (e.g., storage server 110B) for performing recovery system operations consistent with teachings of the present invention. As such, the novel techniques are not so limited to the illustrative embodiment described herein.

The recovery system includes an encoding engine 310, a construction engine 320, and a cataloging engine 320 for automatically encoding protection relationship information in attributes of storage objects and constructing a replica catalog using the encoded attributes. Encoding engine 310 may receive protection relationship information supplied by the administrator interfacing with the protection manager (e.g., via console 212) and store the received information in a data structure such as a replica catalog 315. In one embodiment, replica catalog may be resident in memory 210 of FIG. 2, for instance. Additionally, each primary storage object may be represented as an entry in replica catalog 315, in one example.

In further detail, encoding engine 310 receives from the administrator the name of the primary storage object, the name of the primary storage server, and the name of a secondary storage server on which the secondary storage object resides. Details related to the protection of the primary storage object (e.g., storage object settings) may also be supplied by the administrator depending on the type of storage object being protected.

In one embodiment, the primary storage object involves a primary volume so the administrator may supply a dataset name associated with the primary volume. A "dataset" constitutes a group of storage objects (e.g., volumes) organized as a logical unit for configuring and managing the underlying resources in a uniform manner. For instance, a dataset may include a primary volume, a secondary volume backing up the primary volume, and a tertiary volume mirroring the secondary volume. Configuration and management tasks may thus include operations such as listing volumes in the dataset, adding volumes to the dataset, generating storage usage reports for each of the volumes in the dataset, and other operations which can be performed on datasets by the storage server. In addition, a volume entry may include the type of replication (backup, mirror) performed on the primary volume as supplied by the administrator. For each primary volume, encoding engine 310 further generates an identifier (e.g., storage object ID) for uniquely identifying the volume.

In another embodiment, a primary storage object of qtree type may be supplied by the administrator. A qtree entry in replica catalog 315 may include a dataset name supplied by the administrator as well as a qtree ID generated by encoding engine 310. In yet other embodiments, primary storage objects involving snapshots may be stored as snapshot entries in replica catalog 315 which include a timestamp (e.g., time the snapshot was taken), retention type (e.g., frequency in which a snapshot is created, e.g., hourly, daily, etc), and qtree name (e.g., the name of one or more qtrees associated with the snapshot) provided by the administrator. The exemplary information then constitute the storage object settings implemented by the primary storage object which may further be configured on a reconstructed primary storage object to avoid substantial reconfiguration of a secondary storage object. It will be appreciated that additional or different information may be supplied by the administrator and stored in replica catalog 315 for the same or different types of storage objects in accordance with other embodiments of the present invention.

Based on the protection relationship information supplied by the administrator, encoding engine 310 may automatically generate an attribute for the secondary storage object. The attribute may be implemented as a data structure such as attribute 316 constituting the name, for example, of the secondary storage object. Illustratively, encoding engine 310 uses the supplied protection relationship information to generate an alpha-numeric identifier for the secondary storage object for storage in attribute 316. Each identifier may be generated according to an encoding convention or structure depending on the type of the secondary storage object.

For instance, a volume name may be generated in accordance with the following structure for encoding: <dataset>_<replication type>_<source server>_<source volume>_<ID>. Thus, for a volume organized in a dataset "myDS" which mirrors data from a primary volume "volume1" at a storage server "server1", the volume name generated by encoding engine 310 may result in the following: "myDS_mirror_server1_volume1_0" (with the automatically generated ID being "0").

Encoding engine 310 may similarly generate an encoded storage object attribute 316 for a qtree or snapshot. In the case of a qtree, encoding engine 310 may use the encoding structure, <dataset>_<source server>_<source qtree>_<ID>. For snapshots, encoding engine 310 may use the structure for encoding, <timestamp>_<retention type>_<qtree name(s)>. The generated attributes may further be stored in the appropriate entry of replica catalog 315 for association with its respective storage object in certain instances.

It will be appreciated that in some embodiments of the present invention, attribute 316 may constitute an attribute of the storage object other than the name of the storage object. Other encoding structures and conventions may also be used for encoding protection relationship information in an attribute of a storage object. In the exemplary embodiment, information encoded in the attribute may be, but is not necessarily, carried out in a human-readable format. Human-readable format may be preferable for enabling the administrator to determine protection relationship information from manually reviewing the storage object name. This technique may prove advantageous in situations where the administrator manually reconstructs certain storage objects, for instance. However, it will be appreciated that aspects of the present invention are not limited to human-readable formats.

At times, the administrator may desire to change the protection relationship between storage objects. Such changes may involve altering the frequency of replication, the type of replication, and/or the retention type, for instance. In these cases, the administrator may similarly interface with the protection manager to provide the primary storage object name as well as the new storage object settings. Responsive to the update request, encoding engine 310 may store the new information in the appropriate entry of replica catalog 315 and generate a new attribute 316 based on the updated information. Advantageously, these tasks may be performed by encoding engine 310 automatically to ensure that current storage object settings of the primary storage object are preserved in replica catalog 315. Further, the new attribute 316 may be automatically provided to the secondary storage server (e.g., via construction engine 320 described further below) for updating the secondary storage object. In this way, the administrator need not manually perform these tasks as with the conventional techniques during setting updates.

In the recovery system, construction engine 320 may supply protection relationship information, including an encoded attribute generated by encoding engine 310, in a message to the secondary storage server. In one embodiment, the message may include a request for the secondary storage server to construct the secondary storage object using the encoded attribute. In another embodiment, the message may include a request for the secondary storage server to update the attribute of the secondary storage object. Illustratively, construction engine 320 accesses replica catalog 315 to determine the secondary storage server to which the request is sent. When performing an update to an existing protection relationship, construction engine 320 may provide the updated settings to the primary storage object for implementing the new settings. To that end, requests from construction engine 320 may be received by respective storage servers and processed by the file system, for instance, to carrying out construction and update tasks at the storage servers.

In the event replica catalog 315 becomes lost, cataloging engine 330 may be operative to reconstruct replica catalog 315 using the encoded attributes of the secondary storage objects. Replica catalog 315 may become lost if the administrator inadvertently deletes the replica catalog while performing other file system tasks. Alternatively, the entire protection manager may fail resulting in the inability to access any data stored thereon including contents of replica catalog 315. To recover from such a loss, cataloging engine 330 may retrieve the encoded names of the secondary storage objects at each of the storage servers. To that end, cataloging engine 330 may send a message to each of the storage servers requesting the name and type for each of the storage objects managed by the storage server. Responsive to the request, the storage operating system of the storage server may be operative to generate a list of storage objects and provide the list in response to the request.

Upon receipt of the list, cataloging engine 330 may process the received names and their corresponding storage object types to extract the protection relationship information. In one embodiment, cataloging engine 330 may extract the information by parsing the name based on the type of the storage object and the encoding structure or convention associated with that name. For example, encoding engine 310 may provide the encoding structure or convention to cataloging engine 330 for each type of storage object. Illustratively, from an encoded volume name, the dataset, replication type, source information (primary storage server and primary volume) and ID may be extracted. From an encoded qtree name, the dataset, source information (primary storage server and primary qtree) and ID may be extracted. Similarly, from an encoded snapshot name, the timestamp, retention type, and qtree name(s) may be extracted. The extracted information for each of the storage objects may then be stored by cataloging engine 330 in a new replica catalog as separate storage object entries, thereby reconstructing replica catalog 315.

When reconstructing replica catalog 315, operations of cataloging engine 330 may be performed at various devices in accordance with various embodiments of present invention. In instances where replica catalog 315 is inadvertently deleted, the replica catalog may be reconstructed by the existing protection manager. In other instances where the protection manager has failed, a new protection manager may be initialized by the administrator to replace the failed protection manager. In this case, cataloging engine 330 may be operative in the new protection manager to retrieve the encoded attributes from the storage servers and extract the protection relationship information from the attributes. In yet other embodiments, cataloging engine 330 may advantageously be operative in a secondary storage server for reconstructing replica catalog 315 at the secondary storage server. This may be preferable when the protection manager has failed, and the administrator does not have a new protection manager readily available, for example.

Each of data structures 315, 316 may be stored in memory of the protection manager (e.g., memory 210) and access by components of the recovery system. In certain embodiments, information stored in data structures 315, 316 may be stored in a single data structure for centralize storage of such information. The data structures may also be stored in the same or different locations in memory or other storage devices, so it will be appreciated that the invention is not so limited by the exemplary embodiment described herein.

Figure 3B:
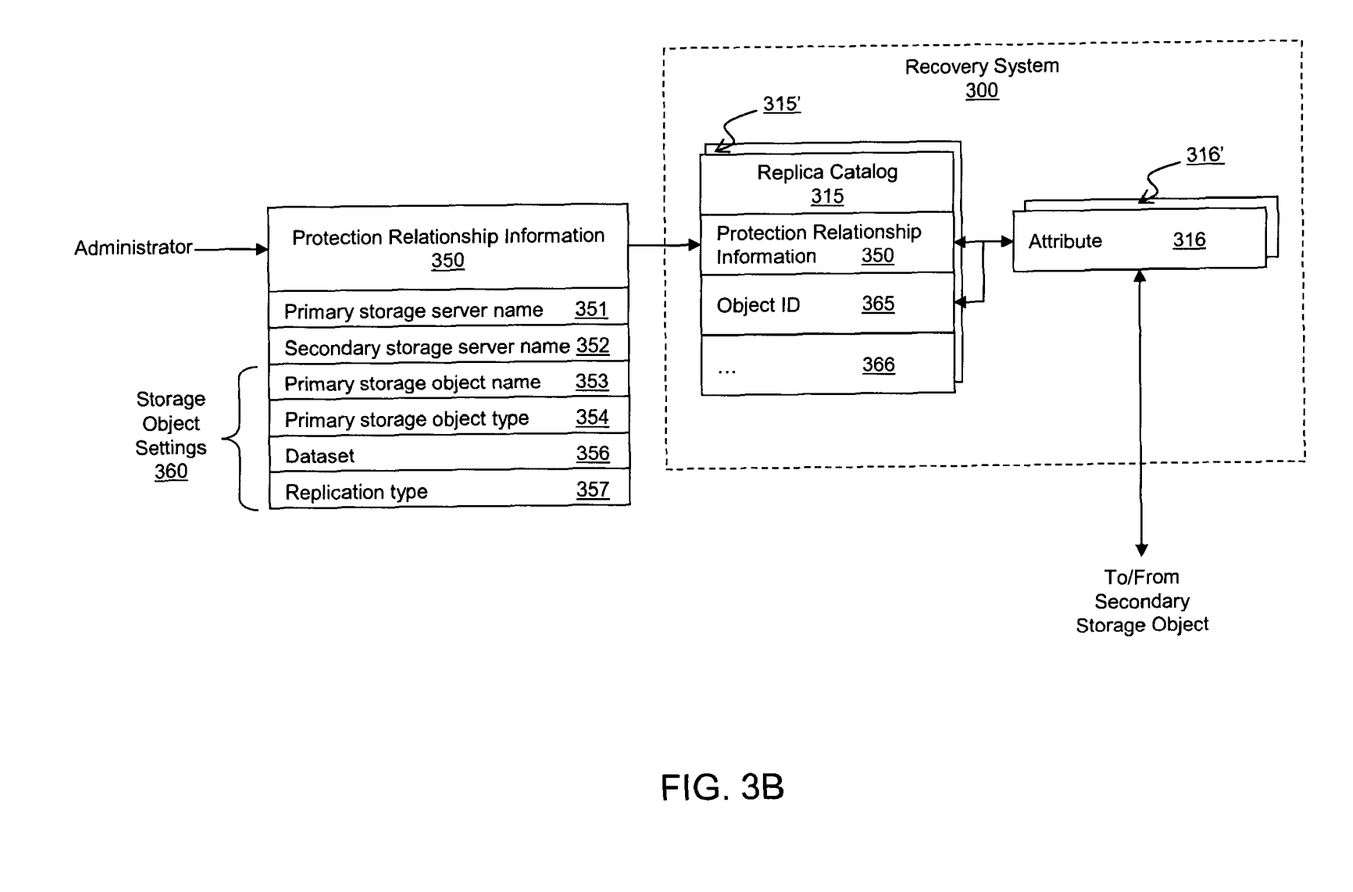
FIG. 3B illustrates exemplary protection relationship information processed by the recovery system to automatically generate an encoded attribute of a secondary storage object according to one embodiment of the present invention.

FIG. 3B shows exemplary protection relationship information 350 processed by the recovery system (e.g., recovery system 300) operative in a protection manager (e.g., protection manager 200) for automatically generating an encoded attribute of the secondary storage object. Illustratively, the primary storage object being protected by the secondary storage object constitutes a volume stored on the network storage system (e.g., system 100). To that end, the administrator may provide protection relationship information 350 including storage object settings 360 of the primary storage object by interfacing with the protection manager. Protection relationship information 350 may accordingly include a primary storage server name 350 and a secondary storage server name 352, as well as a primary storage object name 353, a primary storage object type 354, a dataset 356, and a replication type 357 constituting storage object settings 360 of a primary storage object.

An encoding engine (e.g., encoding engine 310) of the recovery system may store received protection relationship information 350 in replica catalog 315. In accordance with various embodiments of the present invention, protection relationship information 350 may be stored as one or more fields in replica catalog 315 constituting an entry within replica catalog 315. An object ID 365 may also be generated by the encoding engine for uniquely identifying the primary storage object within replica catalog 315. In addition, replica catalog 315 may include yet other information 366 associated with the primary storage object in certain embodiments.

Using the contents of replica catalog 315, the encoding engine may generate attribute 316 by encoding protection relationship information (e.g., storage object settings 360) and object ID 365 in attribute 316. Illustratively, attribute 316 constitutes the name of the secondary storage object for use in constructing the secondary storage object at a secondary storage server (e.g., storage server 110B from FIG. 1A). Attribute 316 may then be provided by a construction engine of the recovery system (e.g., construction engine 320) in a request to the secondary storage server for constructing the secondary storage object using attribute 316.

When subsequently updating storage object settings of the primary storage object, the administrator may again interface with the protection manager to supply new information for storage object settings 360. The new information may then be stored as protection relationship information 350 of replica catalog 315 by the encoding engine. The encoding engine may further generate a new attribute for storage in a new attribute 316' including the new information encoded therein. The construction engine may then provide the new attribute 316' to the secondary storage server, in a request including the existing attribute 316 of the secondary storage object and newly generated attribute 316', for updating the secondary storage object from the old attribute to a new attribute.

Upon a loss or failure with replica catalog 315, a new replica catalog 315' may be generated using protection relationship information 350 encoded in attribute 316 as retrieved from the secondary storage server. To that end, an encoded attribute may be retrieved by a cataloging engine of the recovery system (e.g., cataloging engine 330) and stored in attribute 316. A construction engine of the recovery system (e.g., construction engine 320) may then extract storage object settings 360 encoded in attribute 316 and store such information in protection relationship information portion of an entry in replica catalog 315'. An object ID may also be extracted from attribute 316 and stored in replica catalog 315'. Advantageously, protection relationship information 350, including current storage object settings 360 of the primary storage object, may be preserved by the recovery system.

Automatically Generating Encoded Attributes

Figure 4:
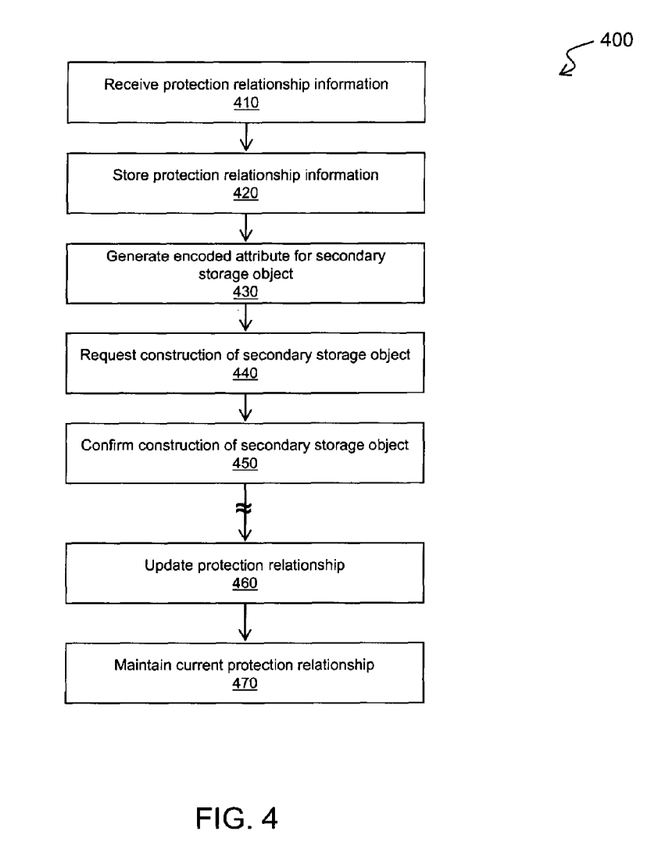
FIG. 4 illustrates a flow diagram of an exemplary process for encoding storage object attributes with protection relationship information in accordance with certain embodiments of the present invention.

FIG. 4 illustrates an exemplary process 400 for automatically generating an encoded attribute based on protection relationship information supplied by the administrator in accordance with certain embodiments of the present invention. Illustratively, process 400 is performed by components of a novel recovery system (e.g., system 300) operative in a protection manager (e.g., protection manager 200) coupled to a primary storage server (e.g., storage server 110A) and a secondary storage server (e.g., storage server 110B) in a network storage system (e.g., system 100).

At block 410, the recovery system receives protection relationship information from an administrator for a primary and secondary storage object. For instance, the administrator may interface with the protection manager at a user console (e.g., user console 212) to supply storage object settings for a primary storage object which constitute the protection relationship information. An encoding engine (e.g., encoding engine 310) of the recovery system may be operative to receive and store such information in a data structure such as a replica catalog (e.g., replica catalog 315 at block 420.

The encoding engine further automatically generates an encoded attribute (e.g., attribute 316) for the secondary storage object (block 430). The encoded attribute may constitute the name of the secondary storage object, for instance, based on information such as a dataset name, replication type, source identifying information, and volume ID when the storage object is a volume. Other information may be used to construct the names for qtrees, snapshots, and other storage objects in the system according to other embodiments of the present invention. The encoded attributes may then be stored by the encoding engine in the replica catalog as storage object entries.

The encoding engine of the recovery system may then request construction of the secondary storage object at the secondary storage server using the encoded attributed (block 440). For instance, a message may be generated by the encoding engine and provided to the secondary storage server which includes the encoded attribute. Responsive to the request, the secondary storage constructs the secondary storage object using the encoded attribute and provides a confirmation that the secondary storage object has been constructed (block 540). In one embodiment, the confirmation may be sent to the primary storage server (i.e. as indicated in the request from the encoding engine) for indicating that data may now be replicated from the primary storage server to the secondary storage server. In another embodiment, the confirmation may be sent to the protection manager and forwarded to the primary storage server for commencing replication.

At some point in time thereafter, the administrator may update the protection relationship between the primary and secondary storage objects (block 460). The encoding engine may, for instance, update the replica catalog, generate a new encoded attribute, and provide the new encoded attribute to the secondary storage object in response to the update request. In this way, the current storage object setting of the primary storage object may be processed by the recovery system updating the replica catalog, as well as updating the encoded attribute of the secondary storage object (block 470). Accordingly, encoded attributes are automatically generated by the recovery system and current protection relationship information may be maintained remotely from the primary storage server at the protection manager (i.e. in the replica catalog) and the secondary storage server (i.e. as the encoded attribute of the secondary storage object).

Reconstructing a Replica Catalog

Figure 5:
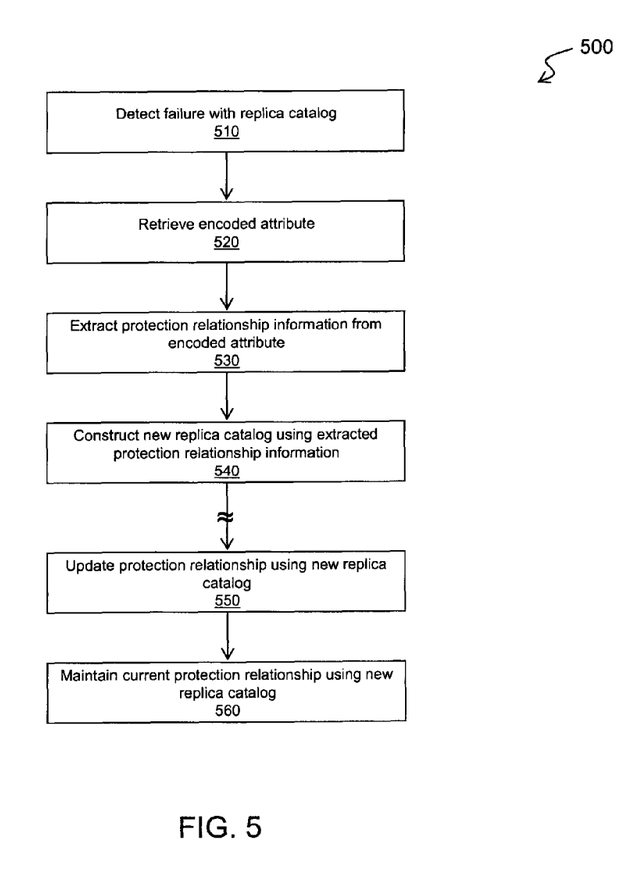
FIG. 5 illustrates a flow diagram of an exemplary process for constructing a new (reconstructed) replica catalog according to one embodiment of the present invention.

FIG. 5 illustrates an exemplary process 500 for reconstructing a replica catalog (e.g., replica catalog 315) upon a loss of the replica catalog. The loss of the replica catalog may involve the inadvertent deletion of the replica catalog by the administrator, or a disaster or other failure with the protection manager, for example. In the case of accidental deletion, the replica catalog may be reconstructed by a recovery system (e.g., recovery system 300) carrying out process 500 at a protection manager upon a failure to access the replica catalog. In a disaster where the protection manager fails, however, the replica catalog may be reconstructed at a different processing device such as a replacement protection manager or the secondary storage server, for instance.

Process 500 commences at block 510 where a failure of the replica catalog (e.g., replica catalog 315) is detected by the recovery system. For instance, an encoding engine (e.g., encoding engine 310) of the recovery system may be unable to access the replica catalog upon receiving protection relationship information from the administrator. Alternatively, a failure may be detected when the replica catalog is inaccessible when processing a storage object setting update request from the administrator. In another embodiment, the secondary storage server may be unable to communicate with the protection manager so a recovery system operative in the secondary storage server may automatically initiate reconstruction of the replica catalog.

Responsive to a failure, a cataloging engine (e.g., cataloging engine 330) of the recovery system retrieves encoded attributes of the secondary storage objects from the storage servers in the system (block 520). Upon receipt, the cataloging engine may process the received information by extracting, for instance, the protection relationship information from the encoded attributes (block 530). In the example discussed with respect to FIG. 3A, a storage object having the name attribute "myDS_mirror_server1_volume1_0" may be received by the cataloging engine. The cataloging engine may then parse the name to determine the dataset name to be "myDS," the replication type to be a "minor," the primary storage object to be "volume1," and the primary storage server to be "server1."

Once the protection relationship information is extracted, the cataloging engine may generate a new replica catalog using the extracted information (block 640). Updates to protection relationships, when subsequently requested by the administrator, may also be processed using the reconstructed replica catalog (block 650). For instance, the encoding engine may access the reconstructed replica catalog for updating storage object settings of the primary storage object and generating new encoded attributes for the secondary storage objects. At block 660, the reconstructed replica catalog may then be operative to maintain the current protection relationship information for the storage objects.

Automatically Reconstructing a Primary Storage Object

Figure 6:
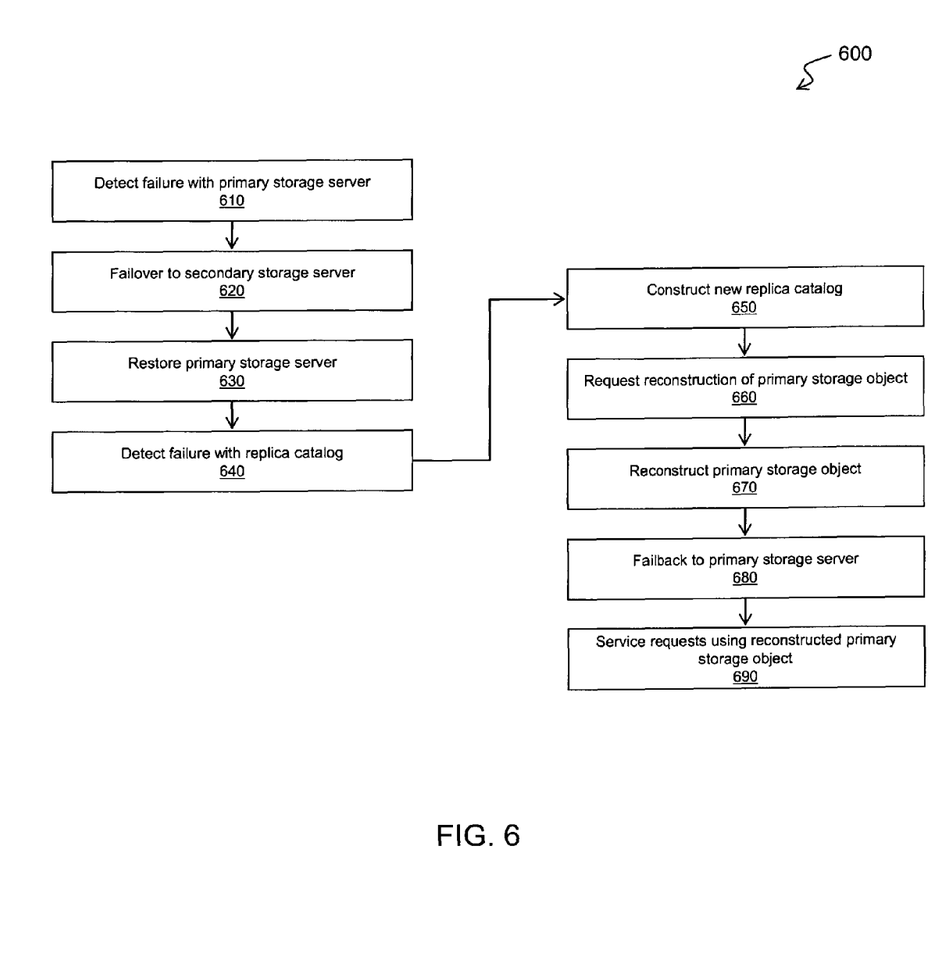
FIG. 6 illustrates a flow diagram of an exemplary process for reconstructing a primary storage object using a reconstructed replica catalog in accordance with one embodiment of the present invention.

FIG. 6 illustrates an exemplary process 600 for reconstructing a failed primary storage object using a reconstructed replica catalog in accordance with one embodiment of the invention. Illustratively, reconstruction of the replica catalog may be performed by a recovery system (e.g., recovery system 300) operative in the protection manager located remotely from the primary storage server (e.g., storage server 110A). Optionally, the recovery system may be operative in the secondary storage server (e.g., storage server 110B) when the protection manager has failed and has not been restored by the administrator.

At block 610, a failure may be detected with the primary storage server implementing a protection relationship with a secondary storage server. In one embodiment, the failure may be detected by the client failing to receive a response from the primary storage server. In addition, the secondary storage server may fail to detect a "heartbeat" of the primary storage server which involves messages sent periodically from the primary storage server to the secondary storage server to indicate normal operations.

When a failure has been detected, requests intended for the primary storage object may be redirected by the client to the secondary storage server. To that end, the secondary storage server may be operative to service storage requests using the secondary storage object (block 620). The process of a secondary storage server receiving client requests and servicing those requests on behalf of the primary storage server in these cases may thus be referred to as a "failover."

At block 630, the primary storage server may be restored by the administrator initializing a new primary storage server, for instance. In other cases, remedial errors of the primary storage server causing a termination of heartbeats may be corrected by replacing components (e.g., failed disks) of the primary storage server. Upon restoring the primary storage server, the primary storage server resumes the delivery of heartbeats to the secondary storage server. When the secondary storage server once again detects heartbeats, the secondary storage server may send a message to the recovery system to reconstruct the primary storage objects. The message may also include the name of the primary storage server which has been restored.

Responsive to the request, a construction engine (e.g., construction engine 320) of the recovery system may attempt to access a replica catalog (e.g., replica catalog 315) to determine the current storage objects settings by which to configure the reconstructed primary storage object. When the construction engine fails to do so as a result of the replica catalog being lost or the protection manager failing, for instance, the construction engine detects a failure with the replica catalog (block 640) which causes the cataloging engine (e.g., cataloging engine 330) of the recovery system to automatically reconstruct the replica catalog (block 650). In one embodiment, cataloging engine reconstructs the replica catalog by retrieving the encoded attributes of storage objects from the secondary storage server and extracts protection relationship from the encoded attributes.

Upon reconstructing the replica catalog, the construction engine may determine the primary storage objects to be reconstructed by traversing the reconstructed replica catalog for storage objects associated with the primary storage server provided in the request. Based on the traversing, the constructing engine may then generate a request, including the current storage objects settings from the reconstructed replica catalog, to construct the indicated storage objects and provide the request to the restored storage server (block 660). Responsive to the request, the primary storage server may construct the primary storage objects in accordance with the settings supplied by the recovery system (block 670).

In configuring a reconstructed storage object, the primary storage server may also send a notification to the secondary server to retrieve data of the secondary storage object. Preferably, client access to the secondary storage object during this replication process may be restricted (e.g., read-only) or unavailable to maintain consistency between the secondary and reconstructed storage objects. In other embodiments, requests may be cached in memory at the secondary storage server, for example, and provided to the reconstructed storage object when normal operations resume at the primary storage server.

At block 680, a "failback" operation may be performed to resume normal operations at the primary storage server. Normal operations include servicing requests using the reconstructed storage object and replicating data to the secondary storage object. In one example, the primary storage server may request the cached requests from the secondary storage server and service such requests using the reconstructed storage object. The protection relationship between the restored storage object and the secondary storage object may further be restored by replicating data of the restored storage object in accordance with the configuration provided by the recovery system. Clients may thus resume sending access requests to the restored primary storage server for servicing thereat, while the secondary storage server resumes its stand-by role (block 690).

Using the techniques described herein, the novel recovery system overcomes the deficiencies of the conventional approaches by reducing or eliminating the manual efforts previously required of a storage system administrator to preserve protection relationship information. Automatic encoding of storage object attributes eliminates the need for the administrator to perform these tasks, which otherwise require specialized knowledge by the administrator to determine the protection relationship information indicated therein. While such information may advantageously be stored remotely from the primary storage server in a replica catalog, the replica catalog itself may be protected against loss by the recovery system automatically reconstructing the replica catalog using the encoded attributes. In addition, current storage object settings may also be preserved to ensure minimal reconfiguration of a secondary storage object when establishing a protection relationship with a reconstructed primary storage object.

It will be appreciated that the variations and examples discussed herein are not intended to be exhaustive or to limit the invention. These variations and examples intend to provide further understanding of embodiments of the present invention.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or the like refer to the action and processes of a computer system or similar electronic computing device that manipulates and transforms data represented as physical (e.g., electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g., electronic) data structures and each coupled directly or indirectly to a computer system bus (or the like) for access. Each of these media may be coupled to a computer system bus through use of an appropriate device for reading and or for writing the media.

What is claimed, is:

1. A computer-implemented method comprising:
   storing, in a network storage system, protection relationship information of a primary storage object protected by a secondary storage object in a replica catalog, the replica catalog located remotely to the primary storage object;
   generating an encoded attribute of the secondary storage object using the protection relationship information;
   constructing the secondary storage object using the encoded attribute;
   detecting a failure with the replica catalog; and
   constructing a new replica catalog by retrieving the encoded attribute from the secondary storage object and extracting protection relationship information from the encoded attribute.

2. The computer-implemented method of claim 1, wherein the protection relationship information comprises a storage object setting of the primary storage object.

3. The computer-implemented method of claim 1, wherein the replica catalog is stored at a protection manager connected to a primary storage server servicing the primary storage object and a secondary storage server servicing the secondary storage object.

4. The computer-implemented method of claim 3, wherein the new replica catalog is constructed at the protection manager.

5. The computer-implemented method of claim 3, wherein the new replica catalog is constructed at the secondary storage server.

6. The computer-implemented method of claim 1, wherein the encoded attribute is generated based on a storage object type of the primary storage object and an encoding convention associated with the storage object type.

7. The computer-implemented method of claim 1, wherein retrieving the encoded attribute comprises requesting a storage object name and storage object type from a secondary storage server servicing the secondary storage object, and receiving the encoded attribute from the secondary storage server in response to the request.

8. The computer-implemented method of claim 1, wherein extracting protection relationship information comprises parsing the encoded attribute based on a storage object type of the secondary storage object and an encoding convention associated with the storage object type.

9. The computer-implemented method of claim 1, further comprising an administrator supplying the protection relationship information by interfacing with a protection manager storing the replica catalog.

10. The computer-implemented method of claim 1, further comprising updating the protection relationship information, the updating comprising:
    updating protection relationship information stored in the replica catalog;
    generating a new encoded attribute of the secondary storage object based on the updated protected relationship information; and
    implementing the new encoded attribute at the secondary storage object.

11. The computer-implemented method of claim 1, further comprising:
    detecting a failure with the primary storage object;
    retrieving a storage object setting of the primary storage object from the reconstructed replica catalog; and
    constructing a new primary storage object using the storage object setting indicated in the reconstructed replica catalog.

12. A computer-implemented method comprising:
    encoding, in a network storage system, a storage object setting of a primary storage object in an attribute of a secondary storage object, the secondary storage object configured in a protection relationship with the primary storage object;
    detecting a failure with the primary storage object;
    determining the storage object setting of the primary storage object by retrieving the attribute from the secondary storage object and extracting the storage object setting from the attribute; and
    implementing the protection relationship between a reconstructed storage object and the secondary storage object by configuring the reconstructed storage object based on the extracted storage object setting.

13. The computer-implemented method of claim 12, wherein the encoding is performed at a protection manager connected to a primary storage server servicing the primary storage object and a secondary storage server servicing the secondary storage object.

14. The computer-implemented method of claim 12, wherein the encoding is performed based on a storage object type of the primary storage object and an encoding convention associated with the storage object type.

15. The computer-implemented method of claim 12, wherein retrieving the attribute comprises requesting a storage object name and storage object type from a secondary storage server servicing the secondary storage object and receiving the attribute from the secondary storage server in response to the request.

16. The computer-implemented method of claim 12, wherein extracting the storage object setting comprises parsing the attribute based on a storage object type of the secondary storage object and an encoding convention associated with the storage object type.

17. The computer-implemented method of claim 12, further updating the storage object setting of the primary storage object, the updating comprising:
   implementing a new storage object setting on the primary storage object;
   generating a new attribute of the secondary storage object based on the new storage object setting; and
   implementing the new attribute at the secondary storage object.

18. A system comprising:
   an encoding engine for generating an attribute encoded with information of a protection relationship between a primary storage object and a secondary storage object;
   a construction engine for configuring the secondary storage object to include the generated attribute; and
   a cataloging engine for determining protection relationship information of the primary storage object by retrieving the attribute from the secondary storage object and extracting the protection relationship information from the retrieved attribute.

19. The system of claim 18, wherein the encoding engine, construction engine, and cataloging engine are operative at a protection manager connected to a primary storage server servicing the primary storage object and a secondary storage server servicing the secondary storage object.

20. The system of claim 18, wherein the attribute is generated based on a storage object type of the primary storage object and an encoding convention associated with the storage object type.

21. The system of claim 18, wherein retrieving the attribute comprises requesting a storage object name and storage object type from a secondary storage server servicing the secondary storage object and receiving the attribute from the secondary storage server in response to the request.

22. The system of claim 18, wherein extracting the protection relationship information comprises parsing the attribute based on a storage object type of the secondary storage object and an encoding convention associated with the storage object type.

23. The system of claim 18, further comprising:
   receiving, by the encoding engine, an update to the protection relationship;
   generating, by the encoding engine, a new attribute of the secondary storage object based on the update;
   providing, by the construction engine, the new attribute to a secondary storage server servicing the secondary storage object.

24. A network storage system comprising:
   a protection manager generating an attribute of a secondary storage object encoded with protection relationship information of a primary storage object protected by the secondary storage object and storing the attribute in a replica catalog;
   a primary storage server servicing the primary storage object, the primary storage server replicating data to the secondary storage object according to the protection relationship information;
   a secondary storage server servicing the secondary storage object configured with the attribute generated by the protection manager;
   wherein upon a failure of the replica catalog and the primary storage object, performing:
      constructing, by the protection manager, a new replica catalog using the attribute retrieved from the secondary storage object; and
      constructing, by the primary storage server, a new primary storage object to implement the protection relationship with the secondary storage object using information stored in the new replica catalog.

* * * * *